United States Patent
Mehos et al.

(10) Patent No.: US 6,487,859 B2
(45) Date of Patent: Dec. 3, 2002

(54) DISH/STIRLING HYBRID-RECEIVER

(75) Inventors: Mark S. Mehos, Boulder, CO (US); Kenneth M. Anselmo, Arvada, CO (US); James B. Moreno, Albuquerque, NM (US); Charles E. Andraka, Albuquerque, NM (US); K. Scott Rawlinson, Albuquerque, NM (US); John Corey, Melrose, NY (US); Mark S. Bohn, Golden, CO (US)

(73) Assignee: Midwest Research Institute, Kansas City, MO (US)

( * ) Notice: Subject to any disclaimer, the term of this patent is extended or adjusted under 35 U.S.C. 154(b) by 0 days.

(21) Appl. No.: 09/920,191

(22) Filed: Jul. 31, 2001

(65) Prior Publication Data

US 2002/0059798 A1 May 23, 2002

Related U.S. Application Data

(60) Provisional application No. 60/222,875, filed on Aug. 3, 2000.

(51) Int. Cl.$^7$ ............................................... B60K 16/00
(52) U.S. Cl. ................. 60/641.8; 60/641.11; 60/641.15
(58) Field of Search ........................... 60/641.8, 641.11, 60/641.15

(56) References Cited

U.S. PATENT DOCUMENTS

| | | | |
|---|---|---|---|
| 4,166,917 A | * | 9/1979 | Dorfeld et al. ......... 136/89 CA |
| 4,335,578 A | | 6/1982 | Osborn et al. |
| 4,586,334 A | * | 5/1986 | Nilsson, Sr. et al. .......... 60/524 |
| 4,911,144 A | * | 3/1990 | Godett et al. ................ 126/433 |
| 5,113,659 A | * | 5/1992 | Baker et al. ................ 60/641.8 |
| 6,183,241 B1 | | 2/2001 | Bohn |

OTHER PUBLICATIONS

Andraka, C.E., et al., "Reflux Heat–Pipe Receivers for Dish Electric Systmes," proceedings of the 22nd Intersociety Energy Conversion Engineering Conference, Philadelphia, PA, 1987.

Diver, R.B. et al., "Solar Test of an Integrated Sodium Reflux Heat Pipe Receiver/Reactor for Thermochemical Energy Transport," Journal of Solar Energy, 1990.

Andraka, C.E., et al., "Testing of Stirling Engine Solar Reflux Receivers," proceedings of the 28th Intersociety Energy Conversion Engineering Conference, Atlanta, GA, 1993.

(List continued on next page.)

Primary Examiner—Hoang Nguyen
(74) Attorney, Agent, or Firm—Paul J. White

(57) ABSTRACT

A hybrid high-temperature solar receiver is provided which comprises a solar heat-pipe-receiver including a front dome having a solar absorber surface for receiving concentrated solar energy, a heat pipe wick, a rear dome, a sidewall joining the front and the rear dome, and a vapor and a return liquid tube connecting to an engine, and a fossil fuel fired combustion system in radial integration with the sidewall for simultaneous operation with the solar heat pipe receiver, the combustion system comprising an air and fuel pre-mixer, an outer cooling jacket for tangentially introducing and cooling the mixture, a recuperator for preheating the mixture, a burner plenum having an inner and an outer wall, a porous cylindrical metal matrix burner firing radially inward facing a sodium vapor sink, the mixture ignited downstream of the matrix forming combustion products, an exhaust plenum, a fossil-fuel heat-input surface having an outer surface covered with a pin-fin array, the combustion products flowing through the array to give up additional heat to the receiver, and an inner surface covered with an extension of the heat-pipe wick, a pin-fin shroud sealed to the burner and exhaust plenums, an end seal, a flue-gas diversion tube and a flue-gas valve for use at off-design conditions to limit the temperature of the pre-heated air and fuel mixture, preventing pre-ignition.

15 Claims, 2 Drawing Sheets

OTHER PUBLICATIONS

Adkins, D.R., et al., "Heat Pipe Solar Receiver Development Activities at Sandia National Laboratories," proceedings of the Renewable and Advanced Energy Conference, Maui, HA 1999.

Gonnov, I.V., et al., "Design and Testing of Heat Exchangers with Liquid Metal Heat Pipes for Stirling Engines," proceedings of the 26th Intersociety Energy Conversion Engineering Conference, Boston, MA 1991.

Laing, D., et al., "Sodium Heat Pipe Solar Receiver for a SPS V–160 Stirling Engine: Development, Laboratory and On–Sun Test Results, " proceedings of the 26th Intersociety Energy Conversion Engineering Conference, Boston, MA, 1991.

Laing, D., et al., "Second Generation Sodium Heat Pipe Solar Receiver for a USAB V–160 Stirling Engine: Evaluation of On–Sun Test Results Using the Proposed IEA Guidelines and Analysis of Heat Pipe Damage," Journal of Solar Energy Engineering, Nov. 1997.

Laing, D. et al., "Design and Test Results of First and Second generation Hybrid Sodium Heat Pipe Receivers for Dish/Stirling Systems," proceeding of the ASME International Solar Energy Converence, Albuquerque, NM, 1998.

Hartenstine, J.R., et al., "Development of a Solar and Gas–Fired Heat Pipe Receiver for the Cummins Power Generation 7.5 kWe Dish/Stirling System," proceedings of the 29th Intersociety Energy Conversion Engineering Conference, Washington, DC 1994.

Noble, J.E., et al., "Test Results from a 10 kWt Solar/Natural Gas Hybrid Pool Boiler Receiver," proceedings of the 4th ASMEIJSME Solar Engineering Joint Conference, Maui, HA, 1995.

Bohn, M.S., "Application of Rediant Burner Technology to Hybrid Dish/Stirling Systems," ASME International Solar Energy Conference, Washington, DC, 1997.

* cited by examiner

US 6,487,859 B2

DISH/STIRLING HYBRID-RECEIVER

This application claims benefit of Provisional Application Ser. No. 60/222,875 filed Aug. 3, 2000.

CONTRACTUAL ORIGIN OF THE INVENTION

The United States Government has rights in this invention pursuant to Contract No. DE-AC36-99GO10337 between the United States Department of Energy and the Midwest Research Institute, and pursuant to DOE Contract No. DE-AC04-94AL85000 with Sandia National Laboratories.

BACKGROUND OF THE INVENTION

1. Field of Invention

The present invention relates to hybrid solar fossil fuel receivers and, in particular to hybrid sodium heat pipe receivers for dish/stirling systems in follow up to and based upon Provisional Application Ser. No. 60/222,875, filed Aug. 3, 2000, and claims the benefit of the priority filing date of said Provisional Application under 35 U.S.C. Section 119(e).

2. Description of the Related Art

Solar dish/sterling systems continue to receive strong interest in concentrating solar research programs, because of their demonstrated high efficiency for conversion of sunlight to electricity. Potential end users have indicated that to satisfy their requirements for continuous, reliable, and economical electricity, these systems will need to be hybridized. Hybridization adds a combustor and two heat exchangers to the existing concentrator, receiver, engine, and electrical system. This addition should cost less than $300/kW to compete with its diesel alternative. In addition to this economic challenge, there is the technical challenge of efficiently firing an engine at 700° C. or more. This requires a well-designed primary heat exchanger as well as a carefully-integrated combustor and recuperator.

Over the past decade or so, a number of programs have addressed various aspects of these challenges. Most have used alkali-metal reflux receivers as the starting point. These receivers are popular because of their isothermal behavior. Their primary benefit is higher system efficiency, enabled by uniform temperature at the Stirling-engine heater heads. For hybrid systems, reflux receivers have a further benefit: they allow separate solar and fired heat-transfer surfaces, and therefore independent optimizations. Conceived nearly 20 years ago, Osborn, D. B., et al., "Solar Power Converter with Pool Boiling Receiver and Integral Heat Exchanger," U.S. Pat. No. 4,335,578, Jun. 22, 1982, alkali-metal reflux receivers have been under intensive development since about 1987. Andraka, C. E., et al., "Reflux Heat-Pipe Receivers for Dish Electric Systems," *Proceedings of the 22nd Intersociety Energy Conversion Engineering Conference*, Philadelphia, Pa., 1987; Diver, R. B., et al., "Solar Test of an Integrated Sodium Reflux Heat Pipe Receiver/Reactor for Thermochemical Energy Transport," Journal of Solar Energy, 1990; Andraka, C. E., et al., "Testing of Stirling Engine Solar Reflux Receivers," *Proceedings of the 28th Intersociety Energy Conversion Engineering Conference*, Atlanta, Ga., 1993; and Adkins, D. R., et al., "Heat Pipe Solar Receiver Development Activities at Sandia National Laboratories," *Proceedings of the Renewable and Advanced Energy Conference*, Maui, Hi., 1999.

In 1991, the Institute for Physics and Power Engineering (IPPE, Obninsk, Russia) reported on several sodium and NaK heat-pipe designs used to transmit power to Stirling engines. Gonnov, I. V., et al., "Design and Testing of Heat Exchangers with Liquid Metal Heat Pipes for Stirling Engines," *Proceedings of the 26h Intersociety Energy Conversion Engineering Conference*, Boston, Mass., 1991. The IPPE designs included gas-fired and solar-heated versions, all with screen wicks. The gas-fired surfaces were elaborate high-parts-count assemblies. Nominally-isothermal operation was demonstrated with metal-vapor temperatures up to 750° C. and electrical output up to 4 $kW_e$. The issues of simultaneous gas and solar (hybrid) operation were not addressed.

Also in 1991, The German Aerospace Research Establishment (DLR) Institute for Technical Thermodynamics (Stuttgart, Germany) reported on their development of a sodium heat pipe receiver with screen wicks, demonstrating transport of 32 kWt at 780° C. Laing, Doerte, et al., "Sodium Heat Pipe Solar Receiver for a SPS V-160 Stirling Engine: Development, Laboratory and On-Sun Test results," *Proceedings of the 26 th Intersociety Energy Conversion Engineering Conference*, Boston, Mass., 1991. Since then, the DLR has continued the development of its design. Laing, D., et al., "Second Generation Sodium Heat Pipe Receiver for a USAB V-160 Stirling Engine: Evaluation of On-Sun Test Results Using the Proposed IEA Guidelines and Analysis of Heat Pipe Damage," *Journal of Solar Energy Engineering*, November, 1997, and most recently, reported on first- and second-generation hybrid designs. Laing, D., et al., "Design and Test Results of First and Second Generation Hybrid Sodium Heat Pipe Receivers for Dish/Stirling Systems," *Proceedings of the ASME International Solar Energy Conference*, Albuquerque, N.Mex., 1998. The DLR hybrids are completely-integrated systems, including a Stirling engine, screen-wick heat-pipe receiver with separate solar and gas-fired surfaces, a natural-gas combustor, a brazed-fin primary heat exchanger, and a recuperator. The first system used a diffusion gas-swirl burner. It was operated for more than 60 hours, with "very acceptable" behavior. The DLR has presented results showing burner operation between about 8 and 22.8 $kW_t$, sodium vapor temperatures up to 790° C., system efficiencies up to 20% (gas only, with the aperture plugged) and combustor efficiencies up to 90%. The second DLR hybrid represents a significant re-design. It uses a lean pre-mix combustion system, chosen to reduce exhaust emissions. The engine heater tubes are relocated to simplify manufacturing.

In 1994, Thermacore reported on its first hybrid heat-pipe receiver, developed for the Cummins Power Generation 7.5 $kW_e$ dish/Stirling system. Hartenstine, J. R., et al., "Development of a Solar and Gas-Fired Heat Pipe Receiver for the Cummins Power Generation 7.5 kWe Dish/Stirling System," *Proceedings of the 29th Intersociety Energy Conversion Engineering Conference*, Washington, D.C., 1994. Thermacore's first system included a sodium heat-pipe receiver, separate solar and gas-fired surfaces, a natural-gas combustor, and an integrated recuperator. It featured nickel-powder wicks, fins milled from the heat-pipe wall, and nozzle-mixing burners. Test results (not reported in the literature) led to a second design that uses pre-mixed metal-matrix burners and circular-finned secondary heat pipes to supply heat to the primary heat-pipe solar receiver. It is believed that this system was tested successfully, although, once again, the test results are not reported in the literature.

In 1995, Stirling Technology Company (STC) reported on its development of a hybrid 10 kWt NaK pool-boiler receiver. Noble, J. E., et al., "Test Results from a 10 kWt Solar/Natural Gas Hybrid Pool Boiler Receiver," *Proceedings of the $4^{th}$ ASME/JSME Solar Engineering Joint*

Conference., Maui, Hi., 1995. The system comprises a NaK pool boiler, separate solar and gas-fired surfaces, a natural-gas combustor, and a stand alone recuperator. The burner was a pre-mixed metal matrix type, delivering heat radiatively and convectively to the pool-boiler wall. The system was thermally loaded with a water-cooled gas-gap calorimeter. Tests were carried out with lamp heating at STC, and later with solar heating at the High Flux Solar Furnace at National Renewable Energy Laboratory (NREL). Full hybrid operation at nominally 700° C. was demonstrated during simulated natural cloud transients, with burner power varying by 2:1.

In 1995, our nascent hybrid receiver efforts were combined to develop a 75-kWt hybrid reflux receiver, with emphasis on manufacturability, cost, and lifetime. Using a ⅙th-scale gas-fired sodium heat pipe, the initial step was to select a candidate burner type and candidate gas fired surface configuration. In 1997, we reported on our study of the applicability of premixed metal-matrix radiant burner technology to hybrid systems. Bohn, M. S., "Application of Radiant Burner Technology to Hybrid Dish/Stirling Systems," *ASME International Solar Energy Conference*, Washington, D.C., 1997.

However none of the foregoing art enables a fully-integrated system, including a burner, pin-fin primary heat exchanger, recuperator, solar absorber, and sodium heat pipe, which is characterized in design to avoid pre-ignition, while attaining robust heat-pipe performance, and long life of the burner matrix, recuperator, and flue-gas seals.

SUMMARY OF THE INVENTION

It is therefor an object of the present invention to provide a fully-integrated hybrid-sodium heat-pipe receiver system, including a burner, pin-fin primary heat exchanger, recuperator, solar absorber, and sodium heat pipe.

It is another object of the present invention to provide a fully-integrated hybrid receiver system, which is characterized in design to avoid pre-ignition, while attaining robust heat-pipe performance, and long life of the burner matrix, recuperator, and flue-gas seals.

It is a yet another object of the present invention to provide a fully-integrated hybrid receiver system for efficiently at 700° C., and more particularly 750° C. sodium vapor temperature.

It is yet another object of the invention to provide a hybrid-receiver having a 68 $kW_t$ solar, gas, or combined throughput.

It is yet another object of the invention to provide a compact metal-matrix radiant burner for use in a hybrid systems solar receiver characterized by low air emissions, consistent with existing and anticipated regulations, but which is not susceptible to pre-ignition when fired using a premixed fossil fuel/air mixture.

It is a further object of the invention to provide a combustion system capable of operation with a fuel/air mixture preheated to 640° C. without pre-ignition.

Additional advantages of the present invention will be set forth in part in the description that follows and in part will be obvious from that description or can be learned from practice of the invention. The advantages of the invention can be realized and obtained by the apparatus particularly pointed out in the appended claims.

Briefly, to overcome the problems of the prior art and in accordance with the purpose of the invention, as embodied and broadly described herein, a hybrid high-temperature solar receiver of the present invention comprises a solar heat-pipe-receiver including a front dome having a solar absorber surface for receiving concentrated solar energy, a heat pipe wick, a rear dome, a sidewall joining the front and the rear dome, a vapor and a return liquid tube connecting to an engine, and a fossil fuel fired combustion system in radial integration with the sidewall for simultaneous operation with the solar heat pipe receiver, the combustion system comprising an air and fuel pre-mixer, an outer cooling jacket for tangentially introducing and cooling the mixture, a recuperator for preheating the mixture, a burner plenum having an inner and an outer wall, a porous cylindrical metal matrix burner firing radially inward facing a sodium vapor sink, the mixture ignited downstream of the matrix forming combustion products, an exhaust plenum, a fossil-fuel heat-input surface having an outer surface covered with a pin-fin array, the combustion products flowing through the array to give up additional heat to the receiver, and an inner surface covered with an extension of the heat-pipe wick, a pin-fin shroud sealed to the burner and exhaust plenums, an end seal, a flue-gas diversion tube and a flue-gas valve for use at off-design conditions to limit the temperature of the pre-heated air and fuel mixture, preventing pre-ignition.

BRIEF DESCRIPTION OF THE DRAWINGS

The accompanying drawings, which are incorporated in and which constitute apart of the specification, illustrate at least one embodiment of the invention and, together with the description, explain the principles of the invention.

DETAILED DESCRIPTION OF THE DRAWINGS

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, examples of methods and materials are now described.

The high-temperature hybrid heat-pipe solar receiver according to the subject invention simply, inexpensively, and efficiently heats a solar sodium heat-pipe receiver, using combustion of fossil fuel, so that the receiver continues to supply heat to an engine, even when the sun is not available. The invention herein includes a very effective recuperator, attaining a high pre-heat temperature, of about 640° C., without pre-ignition and because it is compact and tightly-integrated, minimizing heat and pressure losses. A gas-fired efficiency of 75% is achievable, with overall pressure losses of about 5,800 Pa (pump parasitics ~650 W). It is less expensive than existing technology, because it is simple and can be manufactured using common inexpensive materials and methods.

Figure 1:
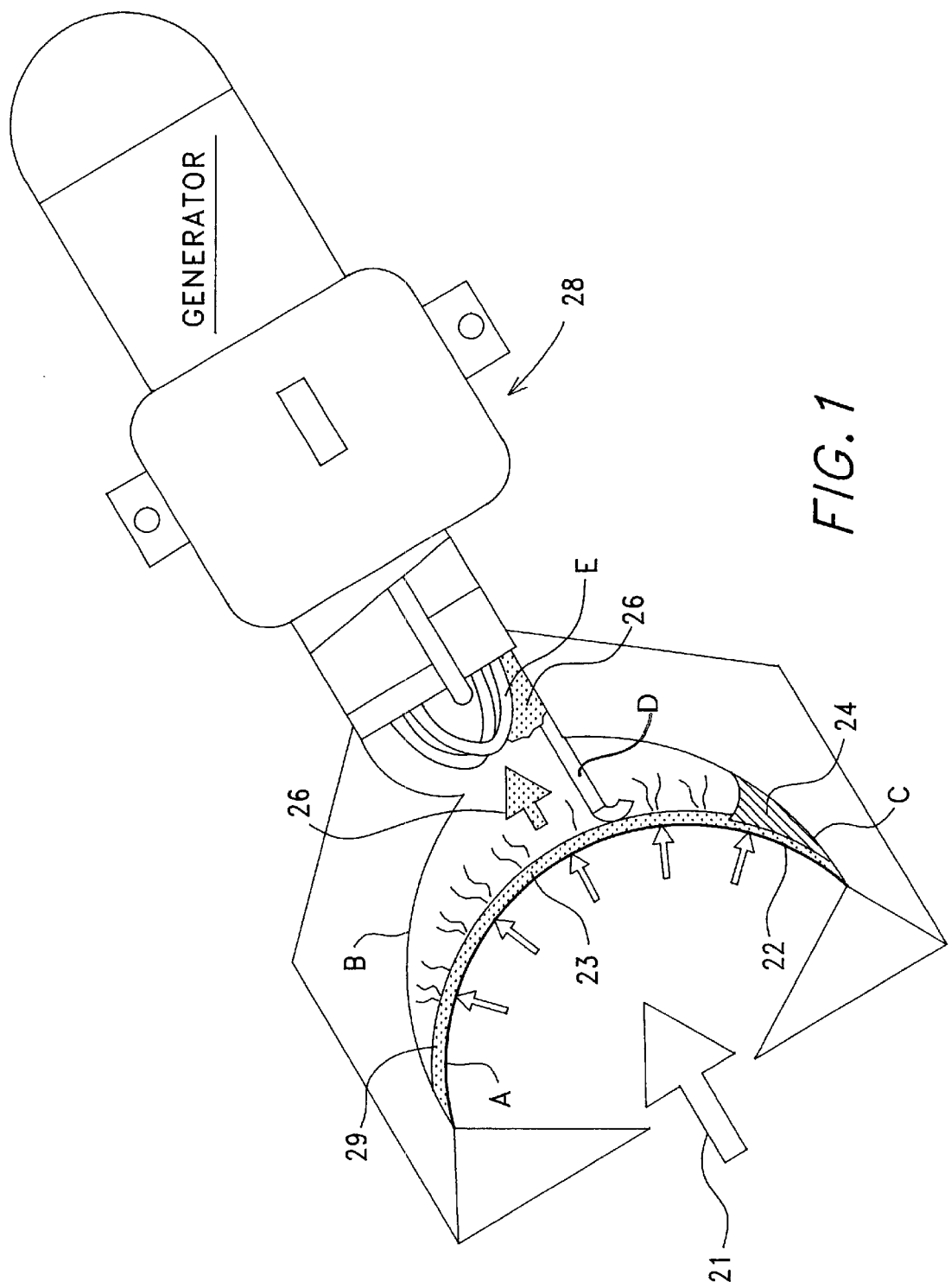
FIG. 1. Is an illustration of a Dish-Stirling Receiver, showing the location of the concentrator, engine heater tubes, heat engine and generator.

Referring now to the drawing figures, wherein like numerals refer to like elements, the elements of the invention are divided into two categories: solar heat-pipe-receiver parts; and combustion-system parts. An example of the solar heat-pipe-receiver parts is shown in FIG. 1. In the figure, the solar heat-pipe-receiver comprises a front dome (A), having an absorber surface 22 for receiving concentrated solar energy 21, with its wick 29, a rear dome (B), sidewalls (C) joining the front dome (A) and rear dome (B), and vapor tube and return liquid tube (D) connecting to an engine 28. Sodium liquid in the wick 29 is heated via the energy flux at the absorber surface 22 from the concentrated solar energy 21. Sodium liquid in the wick 29 is thereby vaporized, and sodium vapor heats engine heater tubes (E) which drives engine 28. Sodium pool 24 results from condensation of sodium vapor 26 at engine heater tubes (E). These parts are incorporated into the combustion system to form the improved hybrid receiver according to the subject invention.

Figure 2:
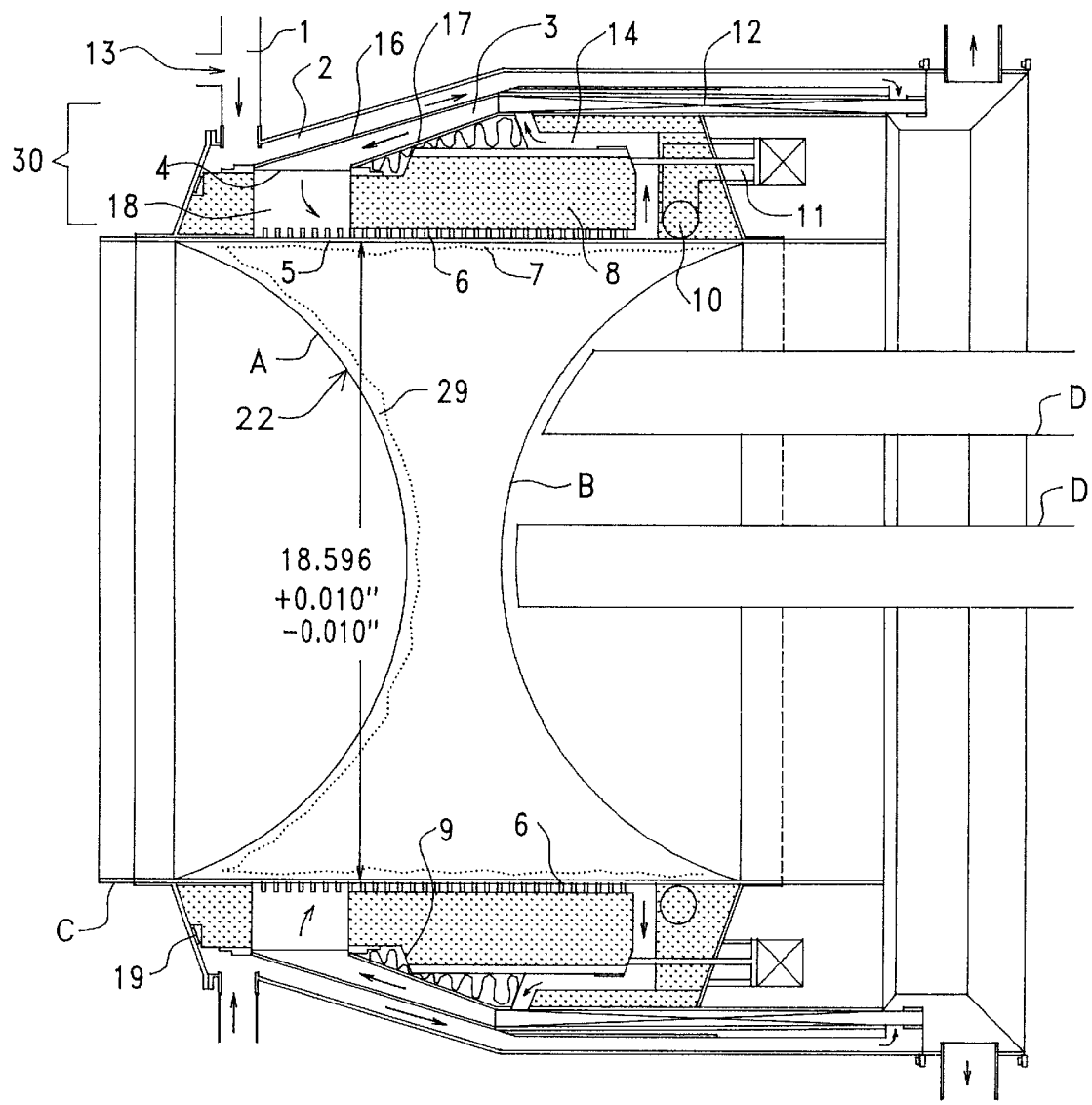
FIG. 2. The cut-away sketch of an embodiment of the present invention. In the figure, the pin-fin array is shown together with the composite RCF sleeve with a spring-loaded seal.

In FIG. 2, the combustion system 30 comprises fuel pre-mixers 1, and outer cooling jacket 2, a burner plenum 3, a porous burner matrix 4, a fossil-fuel heat-input surface 5 added to the receiver (outer surface covered with a pin-fin array 6, inner surface covered with an extension of the existing heat-pipe wick 7), a composite refractory-ceramic-fiber (RCF) pin-fin shroud 8, a spring-loaded end seal 9, a flue-gas diversion tube 10 and a flue-gas valve 11, and a recuperator 12. These elements themselves offer several advantages, and a number of subtle inter-relationships allow their integration into the efficient, simple, cost-effective receiver according to the invention herein, that can function without pre-ignition of the pre-mixed air and fuel.

Air and fuel are thoroughly mixed by introducing the fuel 13 into turbulent air streams well upstream of the receiver cooling jacket 2. The mixed air and fuel is introduced into the cooling jacket 2, where it is desirably cooled to 20° C., tangentially, to promote even flow in this passage. The flow in this passage directly cools the burner plenum outer wall 16, and indirectly cools its inner wall 17, inhibiting pre-ignition in the plenum 13. The air/fuel is ignited downstream of the burner matrix 4, using a hot-surface or spark igniter 18. Some of the heat of combustion raises the temperature of the downstream surface of the burner matrix, causing it to radiate heat, at approximately 1,100°C. to the receiver side-wall C. The combustion products flow through the pin-fin array 6, giving up further heat to the receiver, and then flow through the recuperator 12 at approximately 830° C., giving up additional heat to the system. Using these design parameters, a sodium vapor temperature of about 750°C. can be achieved in the receiver. The flue-gas diversion tube 10 and flue-gas valve 11 are used at off-design conditions to limit the temperature of the pre-heated air and fuel, preventing pre-ignition.

The invention herein uses the metal matrix burner 4 in unique ways, including firing radially inward, facing a 750° C. sink, and using air/fuel pre-heated to 640° C. The pre-mixed metal matrix burner is desired based on its potential for low $NO_x$ emissions, compactness, high turndown, and a wide range of air/fuel ratios. Because this type of burner has the potential for pre-ignition, especially when used with a recuperator, the invention is carefully designed to include cylindrical matrix burner 4, an extended-surface primary heat exchanger 19, a refractory-ceramic-fiber heat-exchanger shroud 8, and a finned recuperator 12. The inside surface of the heat exchanger 19 is lined with an extension of the absorber's heat-pipe wick 7.

A perforated Fecralloy fiber sheet, such as Bekitherm AC 200 P1, N.V. Acotech Zwevegem, Belgium, can be rolled to form the cylindrical burner assembly. A backer-strip of the same material can be spot-welded over the seam. The cylinder 4 is supported by the burner plenum 3, which is welded closed around it. In order to eliminate hot spots on the matrix, the flow through the matrix 4 is made more uniform by introduction of the air and fuel mixture axial from the recuperator 12 into the air fuel plenum 3 with plenum outer wall 16 and plenum inner wall 17 diverging at approximately 4 degrees in order to eliminate recirculation within the plenum.

The cylindrical RCF (80% alumina/20% silica) pin-fin shroud 8 is a composite structure: the inner cylinder desirably comprised of a medium-density alumina/silica that is a good high-temperature insulator, while the outer cylinder is a stronger, denser material with low permeability. The permeability of the medium-density RCF pin-fin shroud 8 ensures that flue-gas by-passing of the pin fins 6 will be <2% of mass throughput. It is sealed to the burner 3 plenum using RCF paper gaskets.

The inherently-low heat flux from flue gas to receiver means that a large heat transfer surface area is required. Since receiver size is limited by wick pumping height, the area must be compact (i.e., finned). The pipe evaporator can be a Haynes Alloy-230 18.75-inch diameter tube, 22 inches long. A stud-welded pin-fin gas-fired surface is feasible and cost-effective. This design is characterized as having acceptable thermal stress, tip temperature, and pressure loss. They can also be applied inexpensively using a high-speed automated stud welder. The hybrid-receiver of the present invention is carefully designed to avoid pre-ignition due, in part, to thermal conduction from the combustion zone to the inner wall of the plenum. This can produce temperatures high enough to initiate combustion. Radiative transport from the inner 17 to outer 16 plenum walls is thereby used to eliminate this problem, in conjunction with sufficient cooling of the outer wall 16.

The heat-pipe wick 29 can be selected from a nickel-powder wick, such as a sintered nickel-powder wick, Thermacore, Lancaster, Pa., or a higher-performance metal-felt wick.

The invention provides a high sodium-vapor (sink) temperature, which is necessary to realize the high-efficiency potential of Stirling engines. The high sink temperature limits the amount of heat that can be transferred, necessitating the recuperator 12 to achieve the goal of 75% gas-fired efficiency.

Turning now to the flue-gas diversion tube and valve (10 and 11, respectively), the purpose of these parts is to limit the preheat temperature and thus prevent preignition when the combustion system is operated at reduced firing rates. At reduced firing rates, the effectiveness of the recuperator 12 naturally increases, increasing the preheat temperature. This increase can be prevented by diverting a small fraction of the combustion products leaving the primary heat exchanger, so that they do not pass through the recuperator, but rather flow directly out of the system and into the atmosphere. This can be accomplished automatically, if desired, using a valve actuator controlled by an automatic-control unit that compares the preheat temperature measured by a temperature sensing means, such as a thermocouple or RTD, with a set-point temperature.

While the present invention has been described and illustrated in detail, it is clearly understood that the same is by way of illustration and example only and is not to be taken by way of limitation, the spirit and scope of the present invention being limited only by the terms of the appended claims.

The embodiment of the invention in which an exclusive property or privilege is claimed are defined as follows:

1. A hybrid high-temperature solar receiver comprising: a solar heat-pipe-receiver including a front dome having a solar absorber surface for receiving concentrated solar energy, a heat pipe wick, a rear dome, a sidewall joining the front and the rear dome, and a vapor and a return liquid tube connecting to an engine, and a fossil fuel fired combustion system in radial integration with the sidewall for simultaneous operation with the solar heat pipe receiver, the combustion system comprising an air and fuel pre-mixer, an outer cooling jacket for tangentially introducing and cooling the mixture, a recuperator for preheating the mixture, a burner plenum having an inner and an outer wall, a porous cylindrical metal matrix burner firing radially inward facing a sodium vapor sink, said mixture ignited downstream of the matrix forming combustion products, an exhaust plenum, a fossil-fuel heat-input surface having an outer surface covered with a pin-fin array, the combustion products flowing through the array to give up additional heat to the receiver, and an inner surface covered with an extension of the heat-pipe wick, a pin-fin shroud sealed to the burner and exhaust plenums, an end seal, a flue-gas diversion tube and a flue-gas valve for use at off-design conditions to limit the temperature of the pre-heated air and fuel mixture, preventing pre-ignition.

2. The hybrid high-temperature solar receiver of claim 1 wherein the air and fuel mixture is introduced tangentially into the cooling jacket at ambient temperature.

3. The hybrid high-temperature solar receiver of claim 1 wherein the flow of the mixture in the cooling jacket directly cools the burner plenum outer wall and indirectly cools the inner wall, inhibiting pre-ignition in the burner plenum.

4. The hybrid high-temperature solar receiver of claim 1 wherein heating the mixture with the burner matrix radiates heat at a temperature of about 1,100° C. to the receiver sidewall, whereby a sodium vapor temperature of about 750° C. is achieved in the receiver.

5. The hybrid high-temperature solar receiver of claim 1 wherein the pin-fin shroud comprises a composite refractory-ceramic-fiber.

6. The hybrid high-temperature solar receiver of claim 1 wherein the end seal is spring loaded.

7. The hybrid high-temperature solar receiver of claim 1 wherein the pin-fins are about 1/8 inch diameter×1/4 inch long and located on 1/4 inch centers, in a square array for diagonal alignment with the flow of the burning mixture.

8. The hybrid high-temperature solar receiver of claim 1 wherein a throughput is 68 kWt solar, gas, or combined.

9. The hybrid high-temperature solar receiver of claim 1 wherein a maximum incident solar power is 75 kW.

10. The hybrid high-temperature solar receiver of claim 1 wherein a gas-fired efficiency is about 75%.

11. The hybrid high-temperature solar receiver of claim 1 wherein a gas turndown is to about 20% maximum.

12. The hybrid high-temperature solar receiver of claim 1 wherein hot spots in the burner matrix are eliminated by introduction of the air and fuel mixture axial from the recuperator into the air fuel plenum with the plenum outer wall and plenum inner wall divergent at about 4 degrees in order to eliminate recirculation within the plenum.

13. The hybrid high-temperature solar receiver of claim 1 wherein the flue-gas diversion tube and valve are used to limit a preheat temperature of the mixture to prevent pre-ignition when the combustion system is operated at reduced firing rates.

14. The hybrid high-temperature solar receiver of claim 13 wherein at reduced firing rates, an increase in the preheat temperature is prevented by diverting a small fraction of the combustion products leaving the fossil-fuel heat-input surface, such that the combustion products do not pass through the recuperator, but rather flow directly out of the combustion system and into the atmosphere.

15. The hybrid high-temperature solar receiver of claim 14 wherein diverting is accomplished automatically using a valve actuator controlled by an automatic-control unit that compares the preheat temperature measured by a temperature sensing means having a set-point temperature.

* * * * *